(12) United States Patent
Eynon et al.

(10) Patent No.: US 6,714,937 B1
(45) Date of Patent: Mar. 30, 2004

(54) SYSTEM AND METHOD FOR VIRTUAL SETUP AND CONFIGURATION FOR A BUILD-TO-ORDER COMPUTER

(75) Inventors: Daniel R. Eynon, Georgetown, TX (US); Elizabeth A. Rowland, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 337 days.

(21) Appl. No.: 09/637,645

(22) Filed: Aug. 11, 2000

(51) Int. Cl.[7] .............................. G06F 17/00; G06F 7/00
(52) U.S. Cl. .............................. 707/102; 713/1; 705/26
(58) Field of Search ........................... 705/1, 26, 29; 707/10, 104.1, 102; 713/1–2

(56) References Cited

U.S. PATENT DOCUMENTS

| | | | | |
|---|---|---|---|---|
| 5,894,571 A | * | 4/1999 | O'Connor | 713/2 |
| 5,897,622 A | * | 4/1999 | Blinn et al. | 705/26 |
| 5,903,878 A | * | 5/1999 | Talati et al. | 705/26 |
| 6,092,053 A | * | 7/2000 | Boesch et al. | 705/10 |
| 6,094,720 A | * | 7/2000 | Cromer et al. | 713/1 |
| 6,125,352 A | * | 9/2000 | Franklin et al. | 705/26 |
| 6,161,176 A | * | 12/2000 | Hunter et al. | 713/1 |
| 6,167,383 A | * | 12/2000 | Henson | 703/13 |
| 6,182,212 B1 | * | 1/2001 | Atkins et al. | 713/1 |
| 6,209,089 B1 | * | 3/2001 | Selitrennikoff et al. | 713/2 |
| 6,240,420 B1 | * | 5/2001 | Lee | 345/810 |
| 6,256,635 B1 | * | 7/2001 | Arrouye et al. | 707/10 |
| 6,334,158 B1 | * | 12/2001 | Jennyc et al. | 709/328 |

OTHER PUBLICATIONS

Rajiv Dewan, Bing Jing, Abrahm Seidmann. "One–to–One Marketing on the Internet", Jan. 1999. Association for Information Systems. Proceeding of the 20th International Conference on Information Systems. pp. 93–102.*

* cited by examiner

*Primary Examiner*—Greta Robinson
*Assistant Examiner*—Susan Rayyan
(74) *Attorney, Agent, or Firm*—Haynes and Boone, LLP

(57) ABSTRACT

A system and method for an end-to-end order fulfillment process that includes a virtual setup and configuration for a build-to-order system is provided. The system includes a computing device. The computing device is for receiving order information from a customer and causing end user environment information to be received in response to receiving the order information. The computing device is also for causing a product to be built in accordance with the order information and causing the product to be configured in accordance with the end user environment information prior to the product being provided to the customer.

33 Claims, 5 Drawing Sheets

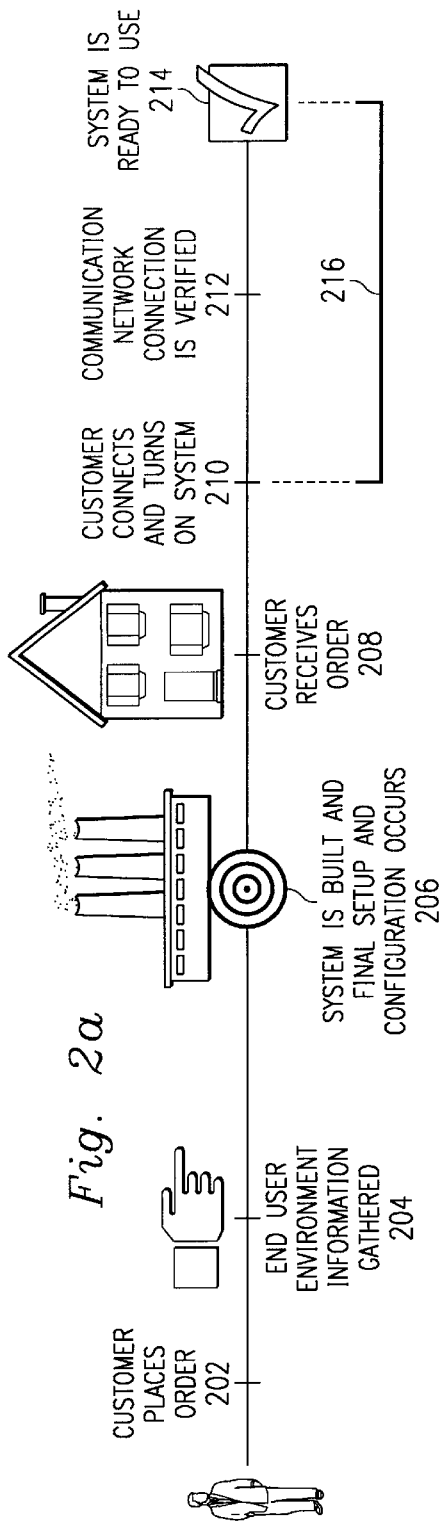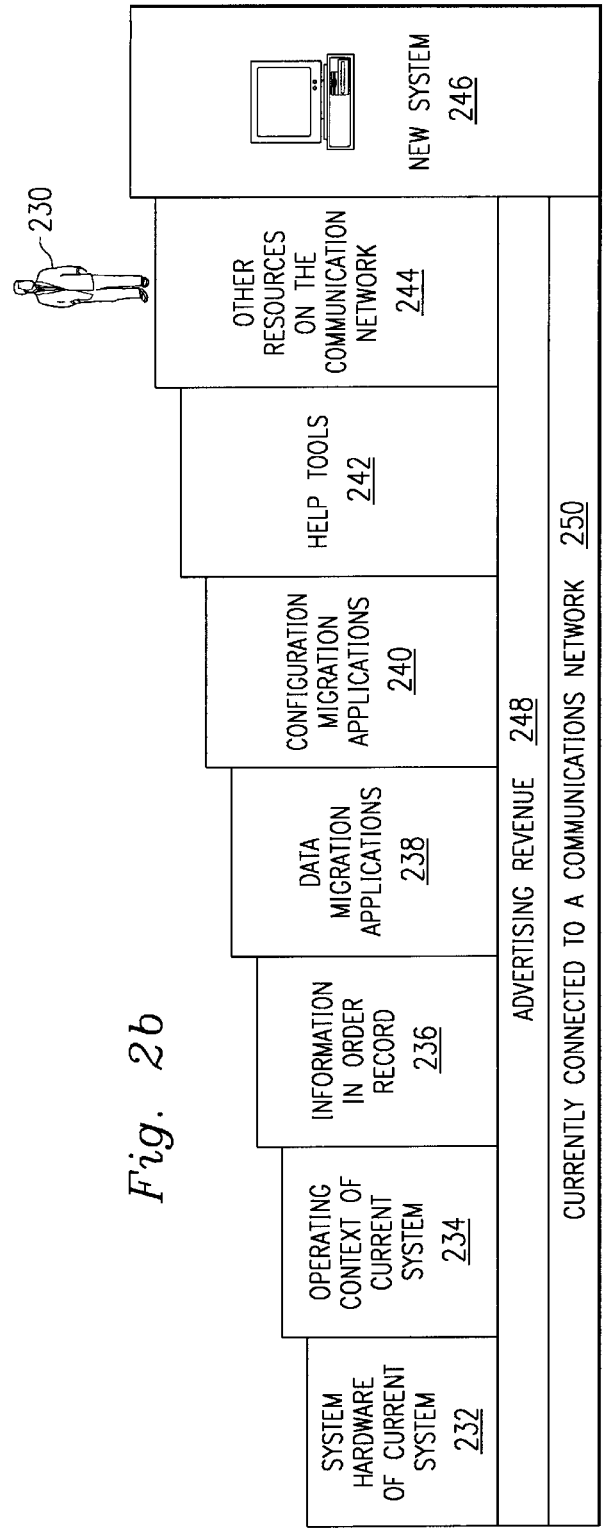

SYSTEM AND METHOD FOR VIRTUAL SETUP AND CONFIGURATION FOR A BUILD-TO-ORDER COMPUTER

BACKGROUND

The disclosures herein relate generally to computer systems, and more particularly, to a system and method for configuring a product using end user environment information prior to the product being delivered to a customer.

This application relates to co-pending U.S. patent application Ser. No. 09/378,020, filed on Aug. 19, 1999, entitled "Method and System for Migrating Stored Data to a Build-to-Order Computing System", naming Sean Glynn and Ed Hubbard as inventors.

This application relates to co-pending U.S. patent application Ser. No. 09/377,727, filed on Aug. 19, 1999, entitled "Method and System for Migrating Configuration Settings into a Computer System", naming Ed Hubbard as inventor.

This application relates to co-pending U.S. patent application Ser. No. 09/158,564, now U.S. Pat. No 6,107,383, filed on Sep. 22, 1998, entitled "Method and Apparatus for Providing Customer Configured Machines at an Internet Site", naming Ken Henson as inventor.

The co-pending applications are incorporated by reference in their entirety, and are assigned to the assignee of this application.

Currently, a customer completes the final operating system (OS) and network setup and configuration process when the customer receives a newly manufactured computer system from a computer vendor. This configuration process may be lengthy and complicated for the customer and may lead the customer to call the computer vendor for assistance. The configuration process generates many technical support calls because the customer may not understand the implications of the information that is being solicited and the resulting behavior of the operating system based on the customer's input. Often, the resulting state of the computer is not correctly configured for the customer's operating environment, as the customer's specific context was not known when the system was built in the factory. As a result, the customer has to correct the setup.

The current OS setup and -configuration process can be broken down into three major steps. First, installation defaults are selected for each OS, device driver, or application during the computer manufacturer's development process. Once selected, these defaults are static and will be installed and configured the same way for all customers. Next, the OS, device drivers, and applications are layered on the hard drive in a pre-installed state based on information contained in a customer's order record during the manufacturing process. The computer system is then booted in a burn rack and partial setup and configuration are completed. Finally, the customer attempts to complete the final setup and configuration of the computer system on receipt of the hardware and software during the end user process. The customer may often have difficulties, either with understanding the setup questions or modifying the factory default configuration. Thus, the customer may require assistance from the computer vendor. From the customer's perspective, it would be desirable for the computer system to be usable without the need for additional setup and configuration. The customer would like to be able to simply connect and plug in the computer system to begin using it. Therefore, what is needed is a system and method that allows a customer to receive and use a computer system without the need for additional setup and configuration.

SUMMARY

One embodiment, accordingly, provides a system and method for an end-to-end order fulfillment process that includes a virtual setup and configuration for a build-to-order system. To this end, a system includes a computing device. The computing device is for receiving order information from a customer and causing end user environment information to be received in response to receiving the order information. The computing device is also for causing a product to be built in accordance with the order information and causing the product to be configured in accordance with the end user environment information prior to the product being provided to the customer.

A principal advantage of this embodiment is that a customer may receive a product such as a computer system that is ready to use with little or no additional configuration. The configuration will have been done by the vendor of the product using end user environment information gathered from the customer and/or other sources. In addition, the amount of technical support needed by a customer may be reduced because the vendor performs the final configuration of the product.

BRIEF DESCRIPTION OF THE DRAWINGS

FIG. 1b is a diagram illustrating a customer perspective of a setup and configuration portion of the prior art end-to-end order fulfillment process of FIG. 1a.

FIG. 2a is a diagram illustrating one embodiment of an end-to-end order fulfillment process that includes a virtual setup and configuration for a build-to-order system.

FIG. 2b is a diagram illustrating a customer perspective of end user environment information gathering in the order fulfillment process of FIG. 2a.

DETAILED DESCRIPTION

In a typical commercial transaction, a customer purchases a product or places an order for the product from a vendor. The customer may provide order information to the vendor which may specify a type and one or more features of the product. The vendor provides the product to a customer where certain options or capabilities of the product are set to factory or manufacturer defaults. These defaults may not be optimal for the customer and the customer may spend a fair amount of time changing these defaults to reflect the customer's preferences, i.e., a customer's desired end user environment for a product may differ from the environment provided by the vendor. As used herein, the term end user environment is intended to refer to the set of options and capabilities of a product that may be set, configured, or enabled according to a customer's preferences. These options and preferences may be set, configured, or enabled using end user environment information. As used herein, the term end user environment information is intended to refer to any information that may be used to set, configure, or enable an option or capability of a product. As shown in the embodiments described below, a vendor may receive end user environment information in addition to order information for a product. The vendor may then configure the product using the end user environment information prior to providing the product to the customer. Although the products described in the embodiments below may refer primarily to computing devices, it may be noted that end user environment information may be received and used to configure other types of products prior to the products being provided to customers.

Figure 1A:
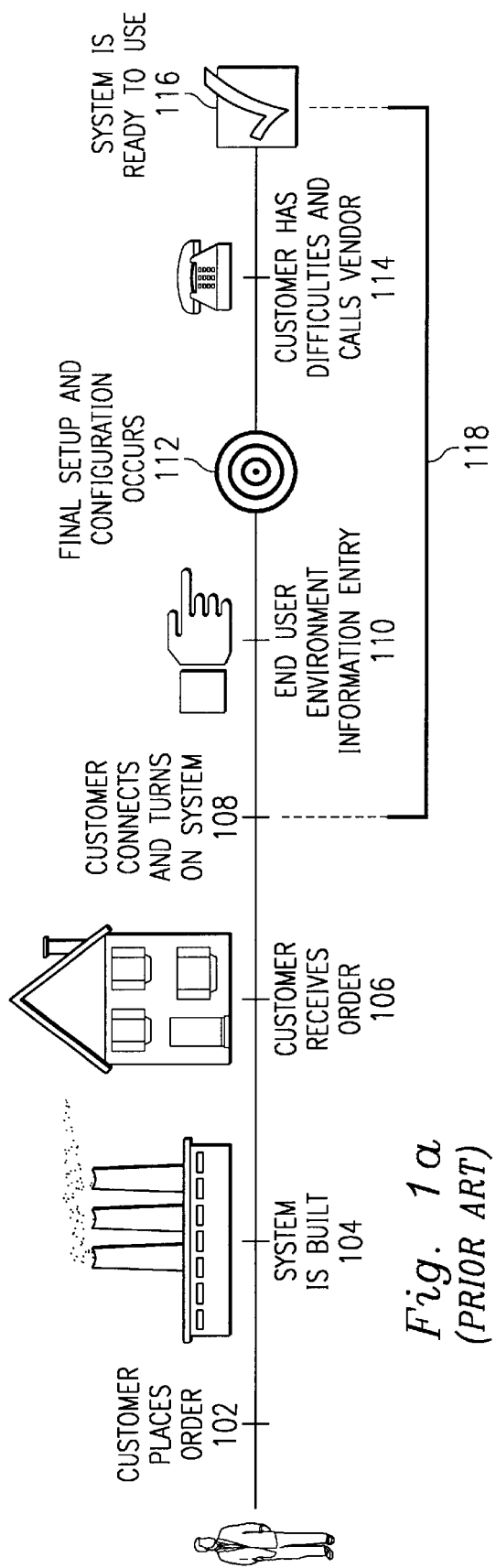
FIG. 1a is a diagram illustrating a prior art end-to-end order fulfillment process.

FIG. 1a illustrates a typical process of obtaining a currently manufactured computer system. A customer places an order 102, the computer system is built 104, and the customer receives the order 106. After the customer receives the order, the customer connects and turns on the system 108. The customer then enters end user environment information 110 and causes the final setup and configuration to occur for the computer system 112. The customer may encounter difficulties in entering the end user environment information or in performing the final setup and configuration and may call the vendor of the computer system for technical support 114. After the customer resolves any difficulties with the end user environment information entry and the final setup and configuration, the computer system may become ready to use 116. It may be noted that the steps 118 performed by the customer may take the customer some time and result in a delay in getting the system up and running.

Figure 1B:
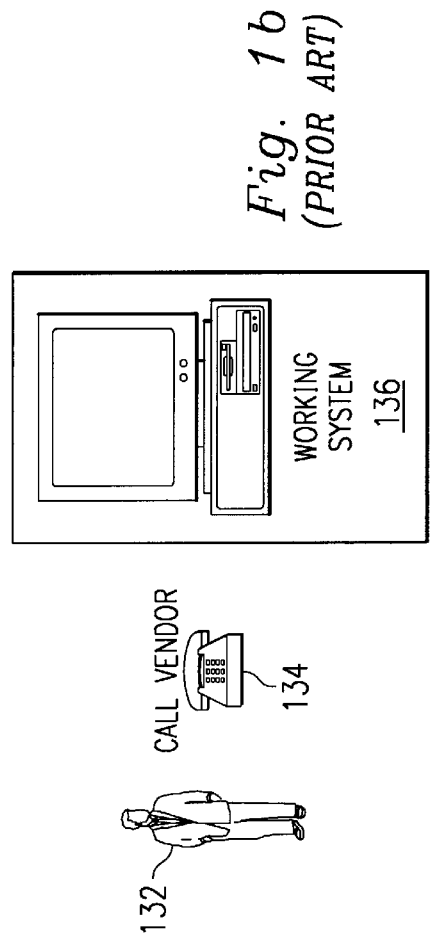

FIG. 1b illustrates a customer's perspective of getting the currently manufactured computer system up and running. After a customer 132 receives the computer system, customer 132 may need to call the vendor of the computer system for technical support 134 before the system becomes a working system 136. Essentially, the step of calling the vendor 134 stands between customer 132 and working system 136. The customer may become unhappy or frustrated when confronted with the need to contact the computer system vendor to get the system up and running.

FIG. 2a is a diagram illustrating one embodiment of an end-to-end order fulfillment process that includes a virtual setup and configuration for a build-to-order system. In FIG. 2a, a customer places an order 202 and end user environment information is gathered 204. The system is then built and final setup and configuration occurs in the factory where the system is built 206. In this embodiment, the system is ready to use 214 after the customer receives the order 208, connects and turns on the system 210, and a communications network connection is verified 212. In contrast to FIG. 1a, the steps 216 performed by the customer are minimized such that the customer is able to get the system ready to use with less delay than the steps 118 in FIG. 1a.

FIG. 2b is a diagram illustrating a customer 230 perspective of end user environment information gathering in the order fulfillment process of FIG. 2a. The blocks in FIG. 2b illustrate some of the types of information and software that are used in this process to gather end user environment information and to configure a new system 246 using the end user environment information. In the model of FIG. 2b, customer 230 connects to a communications network, such as the Internet, using the customer 230 current system (shown in one embodiment as a customer system 302 in FIG. 3) as indicated in block 250. Customer 230 connects to the communications network using a standard browser such as Internet Explorer™ or Netscape Navigator™ or another suitable software application. The end user environment information is gathered from customer 230 and/or the customer 230 current system. Customer 230 is prompted to enter certain end user environment information while other end user environment information is accessed using the customer 230 current system. To expedite the gathering of information, certain information on the customer 230 computer system is detected and accessed automatically without input from customer 230. During the process of gathering end user environment information, customer 230 receives digital advertisements, such as banner advertisements, allowing advertising revenue to be generated for a vendor as indicated in block 250.

After connecting to a communications network, information is obtained from customer 230 and the customer 230 current system to allow a vendor to build new system 246 and configure the system using end user environment information. As indicated by blocks 232 and 234, system hardware information and an operating context from customer 230 current system are gathered as end user environment information and used to configure new system 246 using the customer 230 connection to the communications network. This information is particularly useful where new system 246 has the same or similar features to the customer 230 current system. For example, if both the customer 230 current system and new system 246 use the same operating system, information corresponding to the options and preferences that customer 230 has set or enabled on the customer 230 current system is used to configure these options and preferences in the same or a similar way on new system 246. As a result, these options and preferences are already set or enabled when customer 230 receives and turns on new system 246.

Information in an order record is used as end user environment information to configure new system 246 as indicated in block 236. In addition to the order information that specifies a type and one or more features of new system 246, the order record includes other information that is used to configure the end user environment. For example, using a shipping address of customer 230, a vendor ascertains the time zone of a customer and sets a clock option of new system 246 to reflect the customer 230 time zone.

Data migration and configuration migration applications are used to gather end user environment information that is used to configure new system 246 as indicated in block 238 and block 240. The applications are used to upload data and configuration information from the customer 230 current system for use as part of the end user environment on new system 246. The data includes one or more files on the customer 230 current system. These files are files that customer 230 wishes to copy to new system 246. The files are received as end user environment information and used to configure new system 246. The configuration information includes configuration information for a device, a software application, a network connection, or another component or feature on the customer 230 current system. New system 246 includes a same or similar device, software application, network connection, or other component or feature as the customer 230 current system. Accordingly, configuration information from the customer 230 current system is received as end user environment information and used to configure new system 246.

In the process of gathering end user environment information, customer 230 may have a question about some of the information that is being gathered. To assist customer 230, help tools and other resources on the communications network are provided as indicated in block 242 and block 244, respectively. Customer 230 invokes these help tools or access other resources on the communications network to assist customer 230 in understanding the end user environment information process or the nature of certain information that is being gathered.

Figure 3:
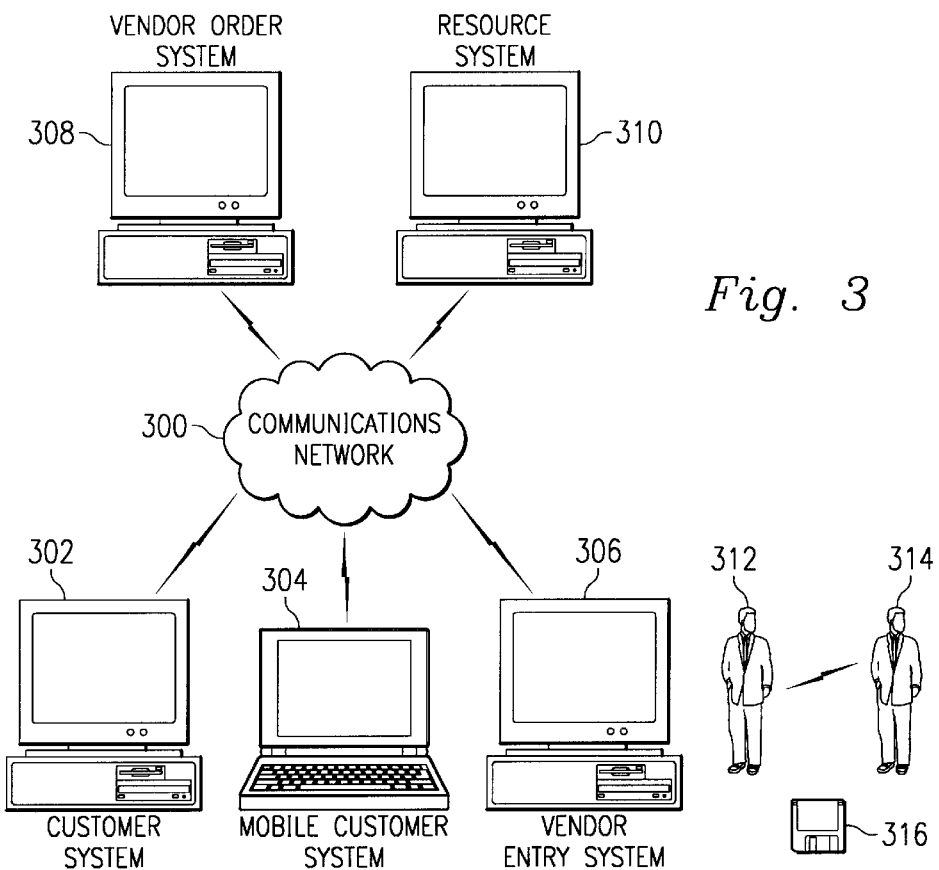
FIG. 3 is a diagram illustrating one embodiment of a system for gathering end user environment information.

FIG. 3 is a diagram illustrating one embodiment of a system for gathering end user environment information. In FIG. 3, customer system 302, a mobile customer system 304, a vendor entry system 306, a vendor order system 308, and resource system 310 are configured to communicate using communications network 300. Communications network 300 may be any suitable communications network such as the Internet. Vendor order system 308 receives order information and end user environment information from customer system 302, mobile customer system 304, vendor entry system 306, and other types of entry computer systems. Customer system 302, mobile customer system 304, vendor entry system 306, a vendor order system 308, and resource system 310 are any computing device that may receive and transmit information such as a server computer, a personal computer, a laptop computer, a personal digital assistant, or a cellular telephone. Mobile customer system 304 may be configured to access communications network 300 using a wireless means.

A customer may place and order for a product using customer system 302, mobile customer system 304, or vendor entry system 306. With customer system 302 and mobile customer system 304, the customer enters order information for a product such as a computer system. The order information specifies a type and one or more features of this product. In particular, the order information specifies the hardware and software to be included in the computer system. The order information is conveyed to vendor order system 308. Vendor order system 308 receives the order information and causes end user environment information to be gathered from the customer and customer system 302 or mobile customer system 304. The end user environment information includes one or more of the types of information described above in FIG. 2b. Vendor order system 308 is configured to cause the customer to be prompted to enter end user environment information. Vendor order system 308 is also configured to cause information stored on customer system 302 or mobile customer system 304 to be detected and gathered and causes that information to be used as end user environment information. Vendor order system 308 may cause this information to be accessed with or without additional input from the customer and may use the information to prompt the customer for additional end user environment information.

A customer also may place an order for a product using vendor entry system 306. With vendor entry system 306, a customer 314 may communicate order information and end user environment information to a vendor representative 312. Customer 314 may communicate with vendor representative 312 in person, by telephone, by email, or other suitable communication means. Customer 314 may also provide the order information and end user environment information to vendor representative 312 using a storage medium 316 such as a diskette. Vendor representative 312 may enter the order information and end user environment information into vendor entry system 306, and vendor entry system 306 may convey the order information and end user environment information to vendor order system 308.

A vendor receives order information and end user environment information at vendor order system 308. Vendor order system 308 causes a product to be built according to the order information and configures the product according to the end user environment information. The vendor then provides the product to the customer. Because the vendor has configured the product according to the end user environment information, the customer begins using the product after receiving it with minimal or no additional configuration.

In the process of gathering end user environment information, the customer may have questions about some of the information being gathered. Vendor order system 308 may be configured to cause the customer to be provided with access to help tools and communications network resources through customer system 302, mobile customer system 304, and vendor entry system 306. The help tools may include help applications, frequently asked questions, or other types of information. The communications network resources may include third party websites or search engines that allow the customer to locate resource information that may help the customer in providing end user environment information. Resource information may be stored on resource system 310. Vendor order system 308 may store a hyperlink to information located on resource system 310 and may provide the hyperlink to customer system 302, mobile customer system 304, and vendor entry system 306.

Vendor order system 308 may also cause digital advertisements to be displayed on customer system 302, mobile customer system 304, and vendor entry system 306 during the order and end user environment information process. Digital advertisements may be stored on vendor order system 308, resource system 310, or another system and may be accessed by vendor order system 308. Vendor order system 308 may cause the digital advertisements to be displayed for the customer. Vendor order system 308 may also cause customer information to be used to select one or more digital advertisements for a particular customer or group of customers. The customer information may include information from the order information or end user environment information of a customer such that the digital advertisement may be targeted to a type of customer. For example, if a customer is placing an order for a computer system, the customer may be provided with a digital advertisement for a product such as a printer or a service such as an Internet service provider that may be used with the computer system.

Figure 4:
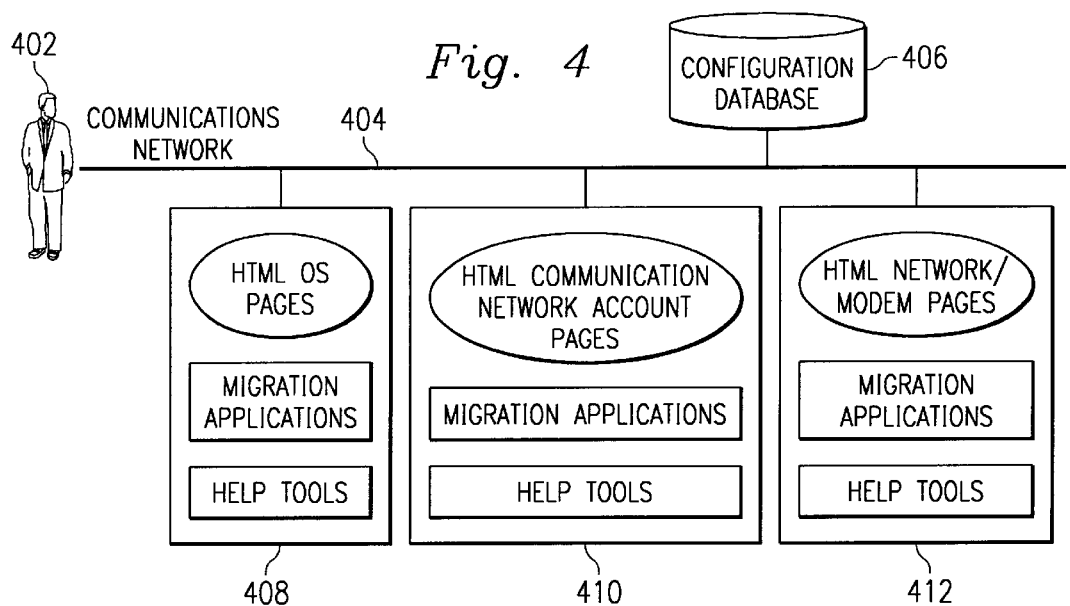
FIG. 4 is a diagram illustrating an embodiment of an architecture to implement the order fulfillment process of FIG. 2b.

FIG. 4 is a diagram illustrating an embodiment of an architecture to implement the order fulfillment process of FIG. 2b. In FIG. 4, a customer 402 may connect to a communications network 404 to access a configurations database 406, a website 408, a website 410, and a website 412. The architecture shown in FIG. 4 may be included in an online build-to-order ordering system and may be used to gather end user environment information.

The architecture shown in FIG. 4 illustrates examples of gathering end user environment information that may be used to configure a new computer system. This architecture may be used in the system shown in FIG. 3. In that system, vendor order system 302 may be configured to store configurations database 406 and websites 408, 410, and 412.

Websites 408, 410, and 412 include information that may be used in conjunction with configurations database 406 to gather operating system information, communications network account information, and network/modem information, respectively, from a customer for use in configuring the end user environment of a computer system.

Website 408 includes hypertext markup language (HTML) operating system (OS) pages, migration applications, and help tools. The HMTL OS pages are displayed on a customer's current system and are used to gather end user environment information for the operating system that will be included in the customer's new system. The migration applications in website 408 may be configured to cause the customer to be prompted to enter end user environment information for this operating system and to cause end user environment information for this operating system to be accessed on the customer's current system. This information may include the language, country, date, and time settings for the customer as well as the customer's assent to be bound to the operating system's license agreement. The migration applications may also access other information such as the customer's name, address, and email address from the order information. If the customer has a question at any point in the operating system information gathering process, the customer may access the help tools. The help tools may include textual descriptions of the type of information being gathered, help applications, or access to other resources on the communications network such as other websites.

Website 410 includes HTML communications network account pages, migration applications, and help tools. The HMTL communications network account pages are displayed on a customer's current system and are used to gather end user environment information to configure the customer's communications network connection. The migration applications in website 410 are configured to cause the customer to be prompted to enter end user environment information so that the customer's communications network connection is established and configured in the new system. The migration applications are configured to detect an existing communications network connection on the customer's current system. If the customer wishes to use the same communications network connection on the new system, then the migration applications cause this communications network connection information to be used to configure a communications network connection on the new system. If not, the migration applications cause the customer to select a communications network service provider such as an Internet service provider (ISP), a price plan, an access telephone number, a user name, and a password, and may use this end user environment information to create the customer's communications network connection on the new system. The migration applications may also cause the customer to enter payment information and consent to the service provider's license agreement. The migration applications also access other information such as the customer's name, address, and email address from the order information. If the customer has a question at any point in the communications network connection information gathering process, the customer may access the help tools. The help tools may include textual descriptions of the type of information being gathered, help applications, or access to other resources on the communications network such as other websites.

Website 412 includes HTML network/modem pages, migration applications, and help tools. The migration applications in website 410 are configured to cause network and/or modem properties to be detected on the customer's current system. The migration applications are configured to prompt the customer to enter additional network and/or modem information. The network and/or modem information that is gathered is used to establish and configure the network and/or modem properties in the new system to allow the new system to connect to a network or another computer system without additional setup and configuration.

If the customer has a question at any point in the operating system information gathering process, the customer may access the help tools. The help tools may include textual descriptions of the type of information being gathered, help applications, or access to other resources on the communications network such as other websites.

Figure 5:
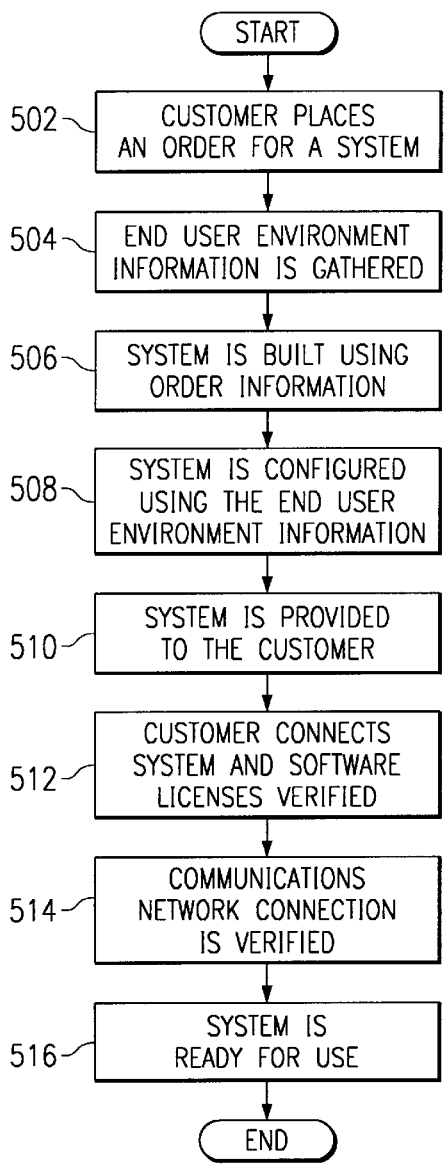
FIG. 5 is a flow chart illustrating an embodiment of a method for an end-to-end order fulfillment process for a build-to-order system that includes a virtual setup and configuration.

FIG. 5 is a flow chart illustrating an embodiment of a method for an end-to-end order fulfillment process for a build-to-order system that includes a virtual setup and configuration. In FIG. 5, a customer places an order for a computer system as indicated in step 502. The order may include order information that specifies a type of the computer system and one or more features of the system. End user environment information is gathered as indicated in step 504. The process of gathering end user environment information may include one or more steps described below in FIG. 6. The computer system is built according to the order as indicated in step 506. The computer system is configured using the end user environment information as indicated in step 508. The computer system is provided to the customer as indicated in step 510. The customer connects the computer system and verifies software licenses as indicated in step 512. A communications network connection is verified as indicated in block 514. The computer system is then ready for use as indicated in step 516.

Figure 6A:
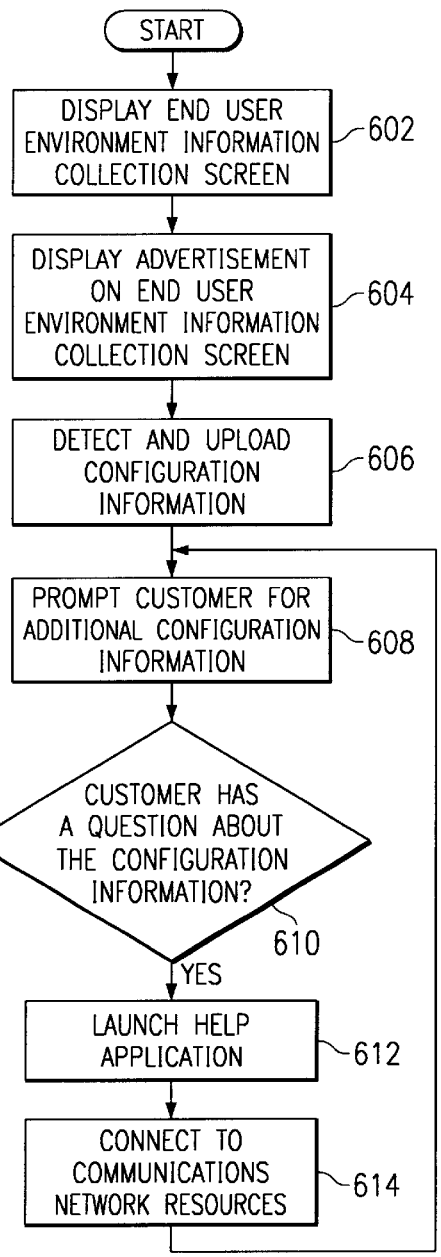
FIG. 6a is a first portion of a flow chart illustrating an embodiment of a method for gathering end user environment information.
Figure 6B:
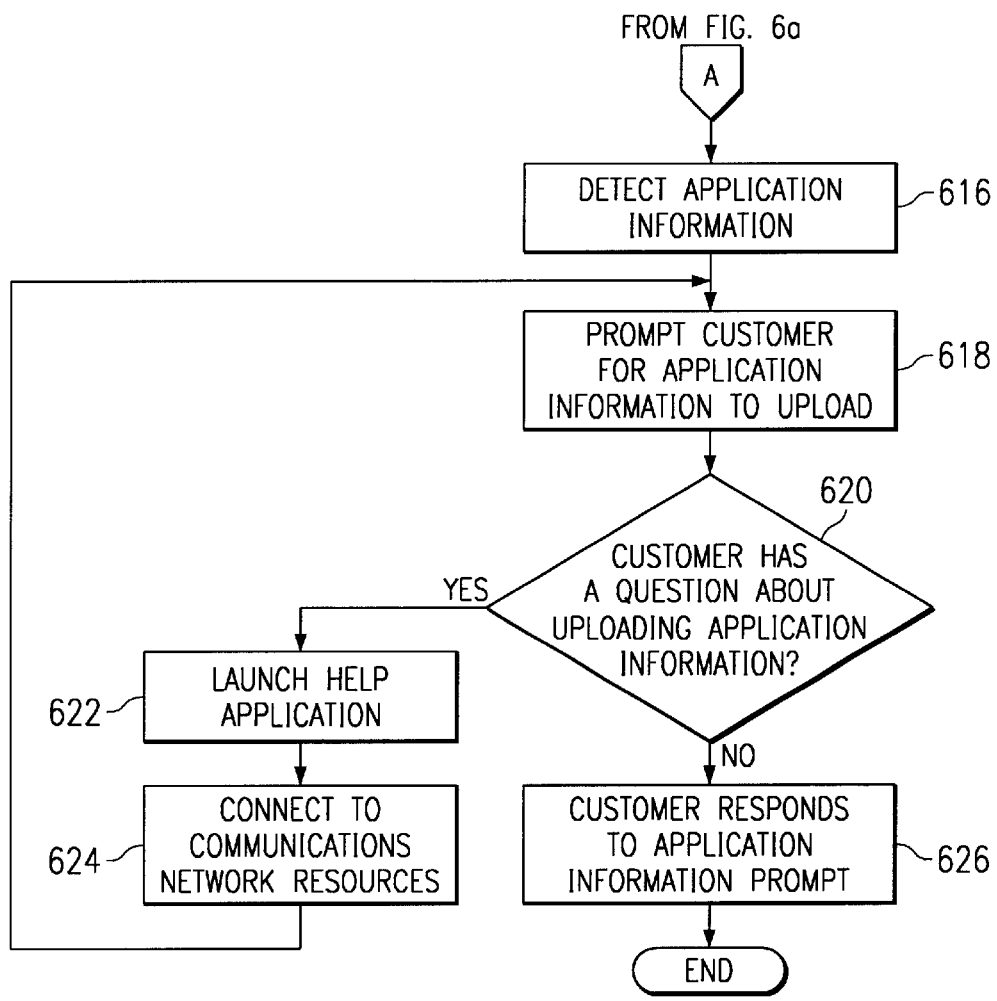
FIG. 6b is a second portion of a flow chart illustrating an embodiment of a method for gathering end user environment information.

FIG. 6 is a flow chart illustrating an embodiment of a method for gathering end user environment information. In FIG. 6, an end user environment information collection screen is displayed as indicated in step 602. An advertisement is displayed on the end user environment information collection screen as indicated in step 604. Configuration information is detected and uploaded as indicated in step 606. A customer is prompted for additional configuration information as indicated in step 608.

A determination is made as to whether the customer has a question about the configuration information as indicated in step 610. If the customer has a question about the configuration information, then a help application is launched as indicated in step 612 and/or the customer connects to communications network resources as indicated in step 614. Once the customer finishes with the help application and/or communications network resources, the customer is again prompted for additional configuration information as indicated in step 608. If the customer does not have a question about the configuration information, then the customer responds to the configuration information prompt as indicated in step 615.

Application information is detected as indicated in step 616. The customer is prompted for application information to upload as indicated in step 618. A determination is made as to whether the customer has a question about uploading the application information as indicated in step 620. If the customer has a question about uploading the application information, then a help application is launched as indicated in step 622 and/or the customer connects to communications network resources as indicated in step 624. Once the customer finishes with the help application and/or communications network resources, the customer is again prompted for application information to upload as indicated in step 618. If the customer does not have a question about the application information, then the customer responds to the application information prompt as indicated in step 626.

As can be seen, the principal advantages of these embodiments are that a customer may receive a product such as a computer system that is ready to use with little or no additional configuration. The configuration will have been done by the vendor of the product using end user environment information gathered from the customer and/or other sources. In addition, the amount of technical support needed by a customer may be reduced because the vendor performs the final configuration of the product. In the process of providing the end user environment information, the customer may access help tools and other resources to provide background information and answer questions about the end user environment information being obtained. Using the embodiments herein, the customer's overall experience with the vendor may be improved as the customer receives a product directly from the vendor with the configurable parts of the product preset to a customer's preferences.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A system for configuring a computer system product comprising:
    an order computing device for:
        receiving, by a vendor, order information from a customer;
        causing, by the vendor, end user environment information to be received from the customer in response to receiving the order information, some end user environment information being provided by the customer after the customer is prompted for end user environment information and some end user environment information being accessed automatically without input from the customer;
        causing, by the vendor, the computer system product to be built in accordance with the order information; and
        causing, by the vendor, the computer system product to be configured in accordance with the end user environment information prior to the computer system product being provided to, and activated by, the customer.

2. The system of claim 1, further comprising:
    a communications network;
    an entry computing device for communicating with the order computing device using the communications network; and
    the order computing device for causing the entry computing device to prompt the customer to enter a portion of the end user environment information into the entry computing device.

3. The system of claim 2, wherein the entry computing device is for receiving a help inquiry from the customer and conveying the help inquiry to the order computing device, and wherein the order computing device is for causing a help application to be launched in response to the help inquiry.

4. The system of claim 2, further comprising:
    a resource computing device for communicating with the entry computing device using the communications network;
    the entry computing device for receiving a search inquiry corresponding to the portion of the end user environment information from the customer and conveying the search inquiry to the resource computing device;
    wherein the resource computing device is for conveying resource information to the entry computing device in response to the resource inquiry; and
    wherein the entry computing device is for displaying the resource information.

5. The system of claim 2, wherein the order computing device is for causing a digital advertisement to be accessed from a database and to be conveyed to the entry computing device, and wherein the entry computing device is for displaying the digital advertisement.

6. The system of claim 2, wherein the order computing device is for causing a portion of the end user environment information to be read from a memory associated with the entry computing device.

7. The system of claim 1, wherein the end user environment information includes a copy of one or more files provided by the customer.

8. The system of claim 1, wherein the end user environment information includes configuration information corresponding to the operating system.

9. The system of claim 1, wherein the end user environment information includes configuration information corresponding to the application.

10. The system of claim 1, wherein the end user environment information includes configuration information corresponding to the device.

11. The system of claim 1, wherein the end user environment information includes configuration information corresponding to the computer network.

12. The system of claim 1, wherein the end user environment information includes service provider information and payment information.

13. The system of claim 1, wherein the order information specifies a type of the computer system product and one or more features of the computer system product.

14. A method of configuring an information handling system comprising:
    a vendor receiving from a customer order information describing an information handling system desired by the customer;
    the vendor manufacturer causing end user environment information to be received from the customer in response to receiving the order information, some end user environment information being provided by the customer after the customer is prompted for end user environment information and some end user environment information being accessed automatically without input from the customer;
    the vendor building the system in accordance with the order information; and
    the vendor configuring the system in accordance with the end user environment information prior to the system being provided to and activated by, the customer.

15. The method of claim 14, further comprising:
    receiving a help inquiry from the customer; and
    causing a help application to be launched in response to the help inquiry.

16. The method of claim 14, further comprising:
    receiving a search inquiry corresponding to a portion of the end user environment information from the customer;
    causing a search to be performed using the search inquiry; and
    providing resource information corresponding to the search inquiry to the customer.

17. The method of claim 14, further comprising:
    accessing a digital advertisement from a database; and
    providing the digital advertisement to the customer.

18. The method of claim 14, further comprising:

reading a portion of the end user environment information from a memory associated with a customer computer.

19. The method of claim 14, wherein the information handling system comprises a computer system, and wherein the end user environment information includes a copy of one or more files provided by the customer.

20. The method of claim 14, wherein the information handling system comprises a computer system that includes an operating system, and wherein the end user environment information includes configuration information corresponding to the operating system.

21. The method of claim 14, wherein the information handling system comprises a computer system that includes an application, and wherein the end user environment information includes configuration information corresponding to the application.

22. The method of claim 14, wherein the information handling system comprises a computer system that includes a device, and wherein the end user environment information includes configuration information corresponding to the device.

23. The method of claim 14, wherein the information handling system comprises a computer system configured to connect to a computer network, and wherein the end user environment information includes configuration information corresponding to the computer network.

24. The method of claim 14, wherein the information handling system comprises a computer system configured to connect to a computer network, and wherein the end user environment information includes service provider information and payment information.

25. The method of claim 14, wherein the order information specifies a type of the product and one or more features of the product.

26. A method of configuring a computer system comprising:

obtaining order information describing a computer system to be purchased by a customer;

obtaining end user environment information corresponding to the system in response to obtaining the order information, some end user environment information being provided by the customer after the customer is prompted for end user environment information and some end user environment information being accessed automatically without input from the customer;

building the system in accordance with the order information;

configuring the system in accordance with the end user environment information prior to delivering the system to the customer; and shipping the system to the customer for activation of the system by the customer.

27. The method of claim 26, wherein end user environment information includes a copy of one or more files provided by the customer.

28. The method of claim 26, wherein the computer system includes an operating system, and wherein the end user environment information includes configuration information corresponding to the operating system.

29. The method of claim 26, wherein the computer system includes an application, and wherein the end user environment information includes configuration information corresponding to the application.

30. The method of claim 26, wherein the computer system that includes a device, and wherein the end user environment information includes configuration information corresponding to the device.

31. The method of claim 26, wherein the computer system is configured to connect to a computer network, and wherein the end user environment information includes configuration information corresponding to the computer network.

32. The method of claim 26, wherein the computer system is configured to connect to a computer network, and wherein the end user environment information includes service provider information and payment information.

33. The method of claim 26, wherein the order information specifies a type of the product and one or more features of the product.

* * * * *